(12) United States Patent
Romero et al.

(10) Patent No.: US 7,850,892 B2
(45) Date of Patent: Dec. 14, 2010

(54) METHOD OF FABRICATING A TEST BLADE OF COMPOSITE MATERIAL

(75) Inventors: Jean-Louis Romero, Melun (FR);
Myriam Wozniak, Boissiee le Roi (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/876,447

(22) Filed: Oct. 22, 2007

(65) Prior Publication Data
US 2008/0099965 A1    May 1, 2008

(30) Foreign Application Priority Data
Oct. 26, 2006    (FR) .................................... 0654541

(51) Int. Cl.
*B28B 1/00*    (2006.01)
(52) U.S. Cl. ........................ 264/257; 264/645; 264/640; 264/258; 264/273; 264/274; 264/40.1; 73/1.01
(58) Field of Classification Search ................. 264/257, 264/640, 643, 645, 328.1, 258, 273, 274, 264/40.1; 73/1.01, 455, 456
See application file for complete search history.

(56) References Cited
U.S. PATENT DOCUMENTS 3,653,098 A * 4/1972 Lagarde et al. ............. 24/114.5
3,772,114 A * 11/1973 Kowalchuk ................. 156/98
5,066,442 A * 11/1991 Gutowski et al. ............ 264/154
2005/0053787 A1* 3/2005 Yamasaki et al. ........ 428/411.1
2005/0084377 A1* 4/2005 Dambrine et al. ....... 416/223 R FOREIGN PATENT DOCUMENTS
DE    102 52 671 C1    12/2003
EP    1 526 285 A1    4/2005
WO    WO 2004/103665 A2    12/2004

OTHER PUBLICATIONS
U.S. Appl. No. 11/876,278, filed Oct. 22, 2007, Romero, et al.

* cited by examiner

*Primary Examiner*—John L Goff
*Assistant Examiner*—Daniel McNally
(74) *Attorney, Agent, or Firm*—Oblon, Spivak, McClelland, Maier & Neustadt, L.L.P.

(57) ABSTRACT

A test blade and a method for fabricating the test blade are presented for use in calibrating a tomography system configured to inspect turbomachine blades for defects. The test blade may include a three-dimensional fiber blank and a polymerized resin. The blank may be created by weaving synthetic material fibers. The resin may be configured to be injected into a mold as a liquid where the resin may polymerize around the fiber blank. The test blade may be configured to be modified to include particular defects such as cut fibers and/or cavity defects which are perceived by the tomography system. The dimensions of the cavity defects may be substantially created by pulling two or more fibers apart at a specific distance with a spreading tool.

10 Claims, 2 Drawing Sheets

METHOD OF FABRICATING A TEST BLADE OF COMPOSITE MATERIAL

The invention relates to a method of non-destructive inspection by tomography of a turbomachine blade made of composite material, more particularly a blade including reinforcement made by three-dimensional weaving. The invention relates more particularly to making a test blade for calibrating the tomography system that is to be used for inspecting all such blades during manufacture. The composite material blades as inspected in this way may in particular be the fan blades of a turbojet.

BACKGROUND OF THE INVENTION

The fan blades of a bypass turbojet can be made of composite material, i.e. material made up of synthetic fibers coated in resin. It is desired to be able to perform non-destructive and systematic inspection on all such blades. The materials used have led to X-ray tomography being selected as the most suitable non-destructive inspection method.

For example, U.S. Pat. No. 6,041,143 describes non-destructive inspection of such a fan blade by tomography. The tomographic reconstruction process is associated with the structure of the fiber mass, and in particular is constituted by plies of a sheet material. In that document, the tomographic reconstruction is adapted as a function of the plies. More precisely, at least one reference ply of a reference model is stored in a non-Euclidean coordinate system, and then when inspecting a real blade, the points of the reference ply are transformed into a system of Euclidean coordinates for the real item. This double transformation serves to show up more clearly defects that are specific to blades of that type in which the fiber mass is constituted by plies in a sheet material, in particular defects constituted by the formation of wrinkles.

The invention relates to non-destructive tomographic inspection of blades of another type that comprises a blank or preform made out of yarns or fibers woven in three dimensions. Such a blank is embedded in resin. For example, patent EP 1 526 285 in the name of the Applicant describes a blade of this kind.

During the process of fabricating this type of blade, various defects can occur. Non-destructive tomographic inspection is used to detect and evaluate such defects.

One specific defect is the formation of clumps of resin within the structure. To detect and evaluate these defects, it is necessary to calibrate the tomographic installation regularly using a test blade, and in particular one that includes such clumps of resin, that are of dimensions that are known, and that are situated at locations that are known.

The invention relates to making such a test blade.

OBJECT AND SUMMARY OF THE INVENTION

More particularly, the invention provides a method of fabricating a test blade of composite material for calibrating X-ray inspection of similar blades, the method consisting in making a three-dimensional blank woven out of synthetic material fibers, creating cavities at predetermined locations in said blank, in inserting said blank into a mold, and in injecting resin under pressure into said mold to obtain said test blade.

Most preferably, the test blade is for calibrating a tomography installation.

A said cavity can be created by introducing a closed spreader tool into the fiber structure of the blank at the selected location, in spreading the tool so as to move the fibers, and in reclosing the tool before withdrawing it from the structure. Scissors have been used successfully as a spreader tool.

During the research that led to the invention, it was found, surprisingly, that the injection of liquid resin under pressure and the subsequent treatment at high temperature did not significantly modify the dimensions of the cavities that had previously been created, but on the contrary that the cavities became completely filled with liquid resin during the resin injection stage.

BRIEF DESCRIPTION OF THE DRAWINGS

The invention can be better understood and other advantages thereof appear more clearly in the light of the following description of a method of fabricating a test blade in accordance with the principle of the invention, given purely by way of example and made with reference to the accompanying drawings, in which.

MORE DETAILED DESCRIPTION

Figure 1:
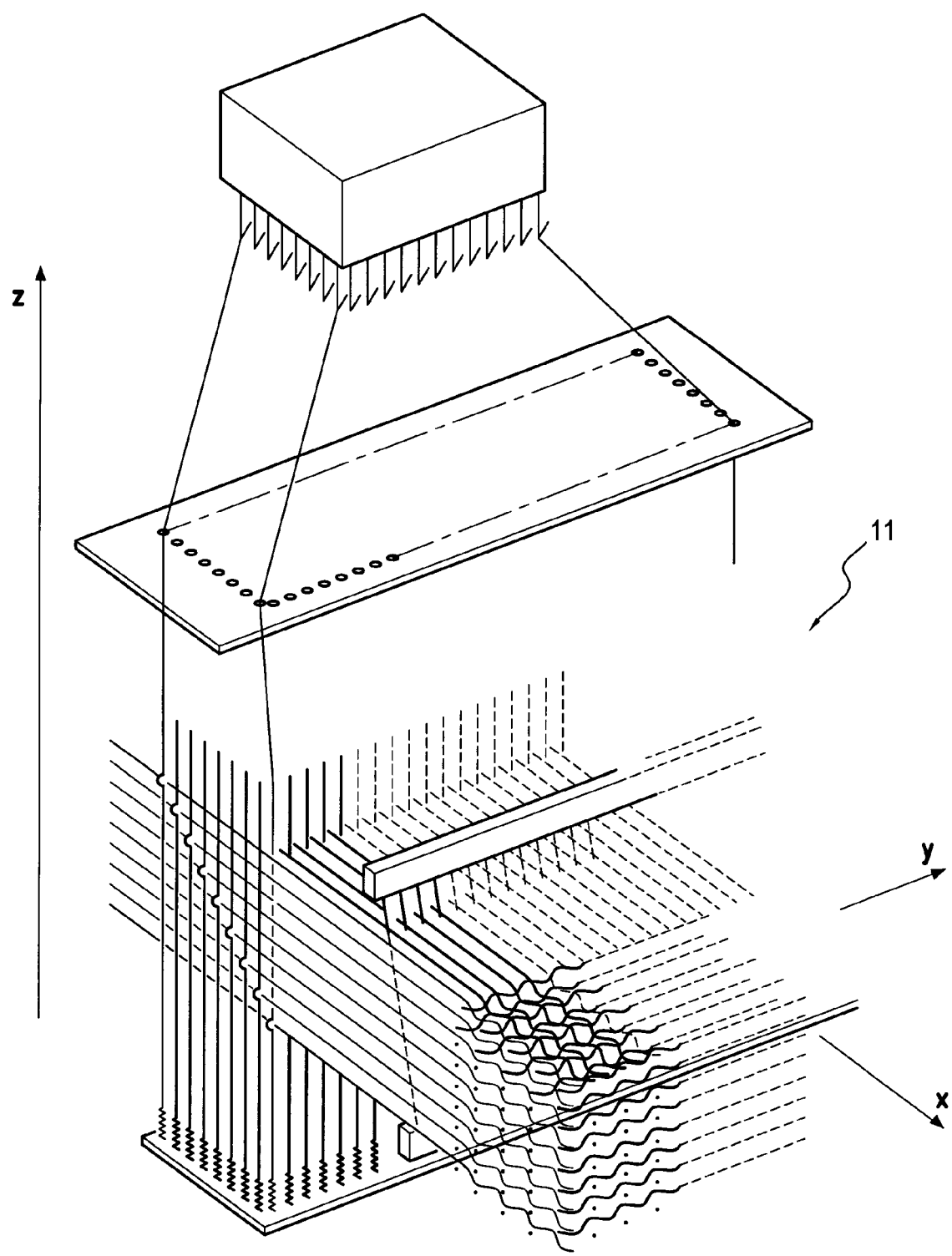
FIG. 1 shows the three-dimensional weaving of a three-dimensional blank.
Figure 2:
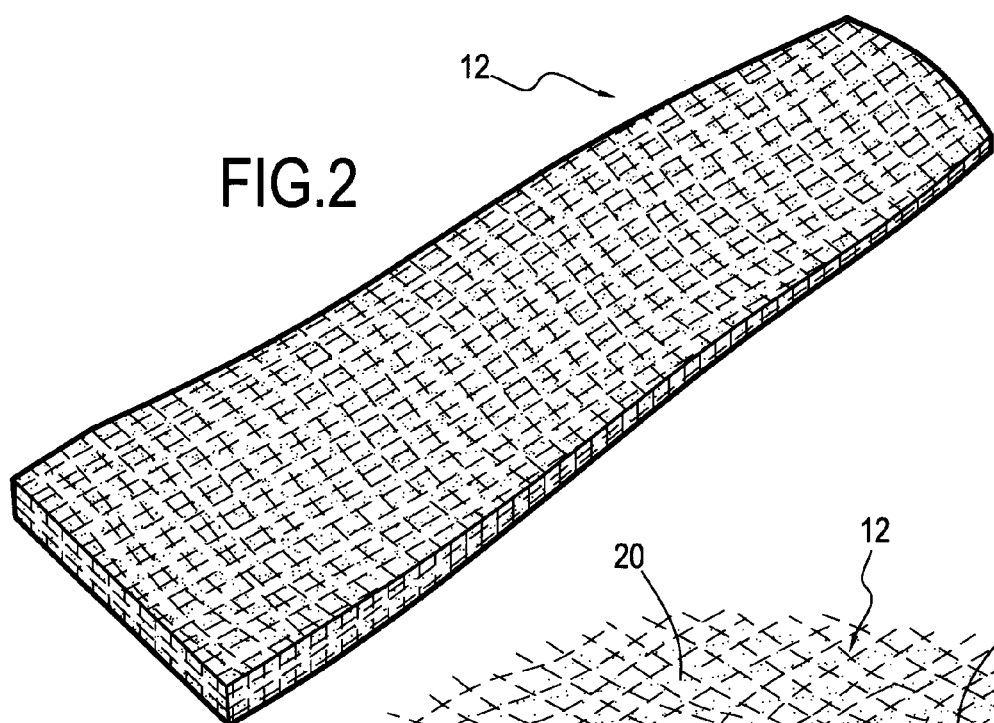
FIG. 2 is a diagrammatic view of the blank as obtained in this way.

With reference to the drawings, there is shown diagrammatically a method of fabricating a test blade that includes a stage of making a three-dimensional blank that is woven out of synthetic material fibers using a loom 11 as shown diagrammatically in FIG. 1. A step of this kind is described in EP 1 526 285, and is not described again. Nevertheless, the invention applies to any type of three-dimensional weaving suitable for making a blank 12 as shown in FIG. 2. The fibers used are preferably carbon fibers. It would also be possible to use fibers made of glass or of aramid.

Figure 3:
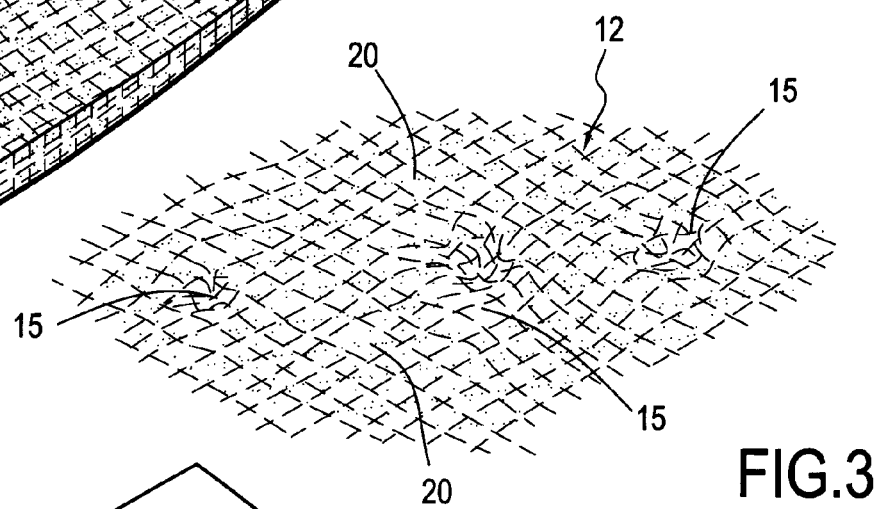
FIG. 3 shows the cavities created in said blank.

The following steps, shown diagrammatically in FIG. 3, consists in creating cavities 15 at selected locations in the blank. The cavities can be made by means of a spreader tool, as mentioned above.

The blank 12 as treated in this way is placed in a mold 16 having a cavity for the described test blade, that is similar in shape and dimensions to the type of blade that is to be subjected to non-destruction inspection by tomography. Thereafter, resin in the liquid state is injected under pressure into the mold. The mold may be heated to a temperature that encourages the resin to polymerize. Control over all these parameters comes within the competence of the person skilled in the art.

By way of example, it is possible to use an epoxy resin (known under the name PR 520) that has already been used with success. Numerous other thermosetting resins could be used, in particular other epoxy resins, polyester resins, phenolic resins, etc. . . . .

For the molding stage, the following conditions have been used (none of them essential):

resin injected at 165° C. at a rate of 300 cubic centimeters per minute ($cm^3$/min) for filling the mold;

injection pressure: up to 17 bars; and baking at 180° C. for 2 hours (h).

It should be observed that other defects could be introduced into the same blank prior to injecting the liquid resin.

Figure 4:
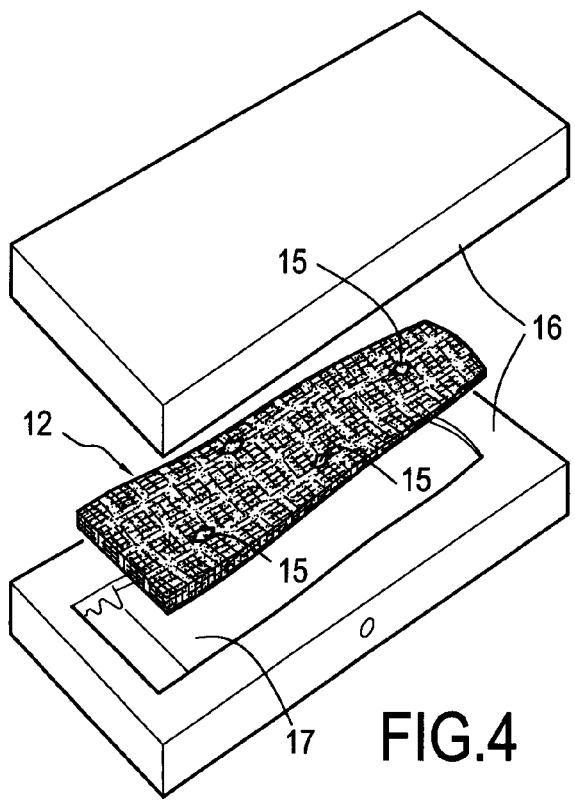
FIG. 4 shows the blank being coated by liquid resin injected under pressure into a mold.

Amongst such defects, mention can be made in particular of breaking strands or weaving as can be perceived by tomography. To be certain of having such defects at predetermined locations in the test blade, it suffices to cut certain fiber strands at selected locations, e.g. merely with the help of scissors, and to draw up a map of the cuts. Such cuts 20 are shown diagrammatically in FIG. 3. Thereafter the molding operation of FIG. 4 is performed.

Figure 5:
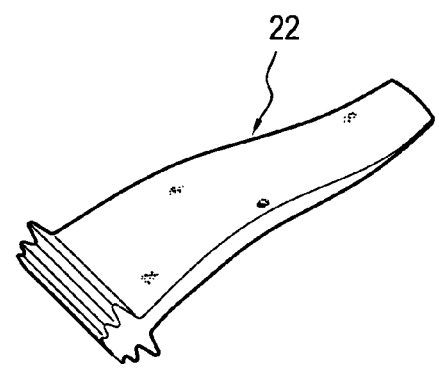
FIG. 5 shows the test blade obtained thereby.

The resulting test blade 22 obtained after molding is shown in FIG. 5.

What is claimed is:

1. A method of fabricating a test blade of composite material and calibrating X-ray inspection of similar real blades, the method comprising:
    making a three-dimensional blank woven out of synthetic material fibers;
    creating cavities at predetermined locations throughout said blank;
    inserting said blank into a mold;
    injecting a resin under pressure into said mold to obtain said test blade, said test blade being similar in shape and dimensions to the real blades, wherein the cavities are created prior to the inserting said blank into the mold and each of the cavities are completely filled with a clump of resin constituting a test blade defect to be detected when calibrating the X-ray inspection; and
    calibrating the X-ray inspection by detecting the test blade defects.

2. A method according to claim 1, wherein certain strands of fibers are cut at selected locations within a blank perimeter prior to injecting the resin.

3. A method according to claim 2, wherein the synthetic material fibers are made of carbon fibers.

4. A method according to claim 3, wherein the resin is an epoxy resin.

5. A method according to claim 3, wherein the resin is a polyester resin.

6. A method according to claim 3, wherein the resin is a phenolic resin.

7. A method according to claim 2, wherein the synthetic material fibers are made of glass fibers.

8. A method according to claim 2, wherein the synthetic material fibers are made of aramid fibers.

9. A method according to claim 2, wherein the certain strands of fibers are cut with a pair of scissors.

10. A method according to claim 1, wherein said creating cavities includes inserting a spreader tool into the woven fibers of said blank and spreading the fibers apart at a first predetermined location and a second predetermined location, wherein the fibers are spread apart at the first predetermined location before the fibers are spread apart at the second predetermined location.

* * * * *